United States Patent [19]

Angert et al.

[11] 4,240,258
[45] Dec. 23, 1980

[54] NON-CUP CUTTING MASTER CYLINDER

[75] Inventors: Richard W. Angert, St. Louis; Stephen G. Palmer, Webster Groves, both of Mo.

[73] Assignee: Wagner Electric Corporation, Parsippany, N.J.

[21] Appl. No.: 958,380

[22] Filed: Nov. 7, 1978

[51] Int. Cl.³ .............................................. B60T 11/28
[52] U.S. Cl. .................................... 60/589; 60/581
[58] Field of Search ................... 60/585, 589, 592, 581

[56] References Cited

U.S. PATENT DOCUMENTS

| 2,060,846 | 11/1936 | Bowen | 60/589 |
|---|---|---|---|
| 2,152,499 | 3/1939 | Rasmussen | 60/589 |
| 2,615,304 | 10/1952 | Groves | 60/589 |
| 2,776,538 | 1/1957 | Schnell | 60/578 |
| 3,174,286 | 3/1965 | Erickson | 60/589 |
| 3,561,215 | 2/1971 | Krusemark | 60/575 |

FOREIGN PATENT DOCUMENTS

| 636348 | 2/1962 | Canada | 60/589 |
|---|---|---|---|
| 1132814 | 7/1962 | Fed. Rep. of Germany | 60/585 |
| 1902235 | 7/1970 | Fed. Rep. of Germany | 60/585 |
| 564596 | 6/1957 | Italy | 60/585 |
| 137348 | 10/1951 | Sweden | 60/589 |

Primary Examiner—Abraham Hershkovitz
Attorney, Agent, or Firm—Darrell F. Marquette

[57] ABSTRACT

A master cylinder including a housing having a fluid reservoir and a cavity. A first piston is movable in the cavity. A sealing member is positioned for movement with the first piston. A fluid chamber is formed in the cavity ahead of the first piston. A second piston is movable within the first piston into and out of sealing engagement with the sealing member to close and open, respectively, a fluid path between the fluid reservoir and the fluid chamber.

3 Claims, 1 Drawing Figure

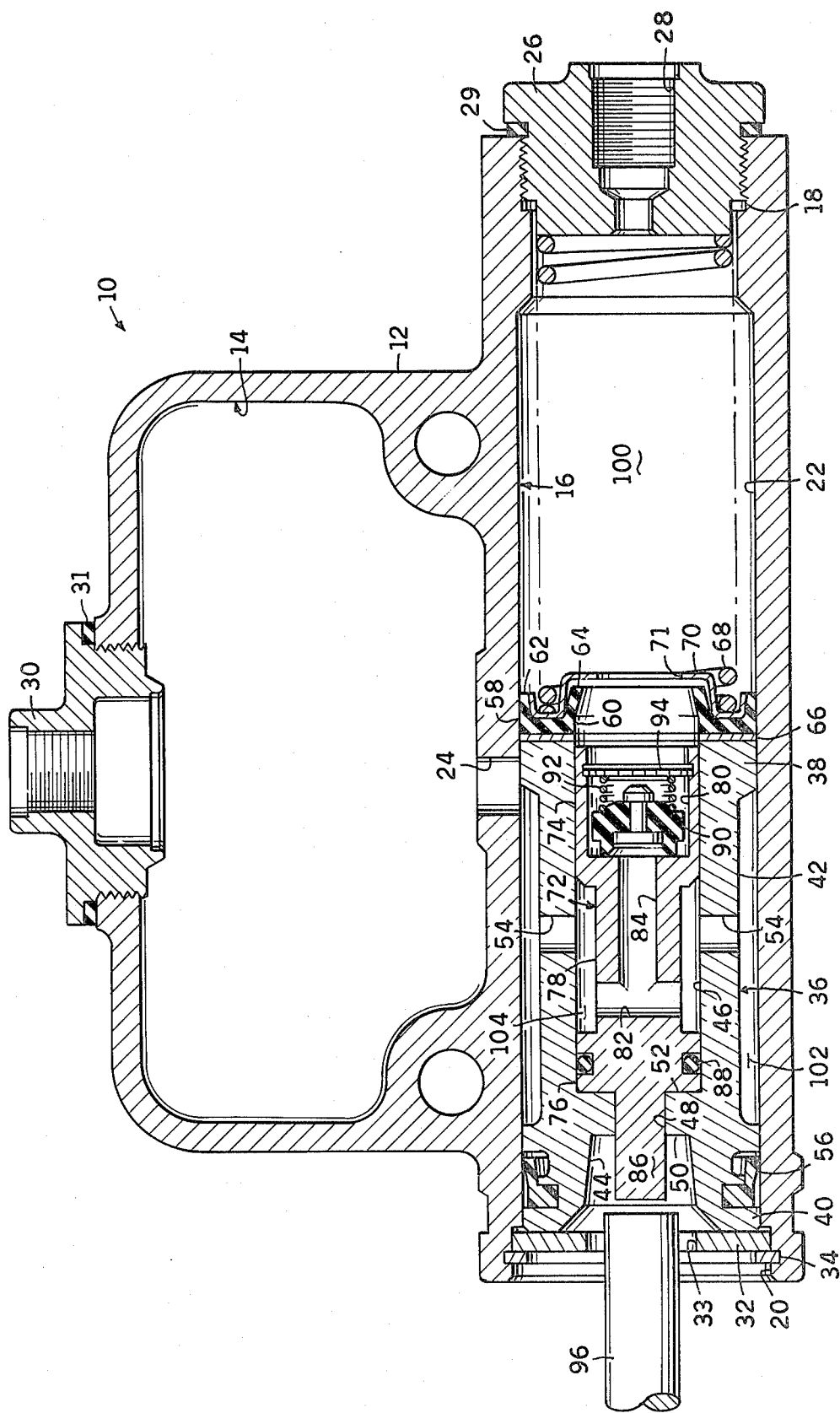

NON-CUP CUTTING MASTER CYLINDER

BACKGROUND OF THE INVENTION

Master cylinders for generating fluid pressure in vehicle hydraulic brake systems have generally included a reservoir, a cylinder, an intake port and a by-pass port providing fluid communication between the reservoir and the cylinder, a piston movably positioned in the cylinder, a primary sealing cup also movably positioned in the cylinder adjacent the forward end of the piston, and a secondary sealing cup carried by the rearward end of the piston. The primary and secondary sealing cups are generally formed of resilient material and have their annular peripheries disposed in sliding and sealing engagement with the annular wall of the cylinder. When the piston is fully retracted in the cylinder, the primary sealing cup is located ahead of the intake port and behind the by-pass port so that fluid seepage and fluid temperature expansion or contraction in the brake system may be compensated for by fluid flow between the cylinder and the reservoir via the bypass port.

When the vehicle brake pedal is depressed, the piston is moved forward in the cylinder thereby moving the primary sealing cup forward past the bypass port. The piston then generates fluid pressure in the brake system for actuating the vehicle wheel brakes. If the fluid pressure increase during the initial forward movement of the piston is significant, such as in disc brake systems, a portion of the annular periphery of the primary sealing cup will probably be extruded into the by-pass port as the primary sealing cup passes over the by-pass port. The edge of the by-pass port then very often cuts off the extruded portion of the primary sealing cup. This is commonly known as cup cutting and results in fluid leakage past the annular periphery of the primary sealing cup which may cause brake failure due to the inability of the master cylinder to generate sufficient fluid pressure to actuate the brakes.

U.S. Pat. No. 3,955,371 shows two master cylinder designs which eliminate this problem of cup cutting. Both master cylinder designs include a secondary piston movably positioned in a secondary cylinder which is formed within the main piston. The secondary cylinder is in open fluid communication with the main cylinder. In one design, the secondary piston is moved rearward in the secondary cylinder as the main piston is moved forward in the main cylinder. A drawback of this design is that the rearward movement of the secondary piston causes fluid pressure surges in the main cylinder between the primary and secondary sealing cups which could result in fluid leakage past the secondary sealing cup. In the other design, the secondary piston is initially moved forward in the secondary cylinder while the main piston remains stationary in the main cylinder. This design has a drawback in that the initial forward movement of only the secondary piston also causes fluid pressure surges in the main cylinder between the primary and secondary sealing cups which could result in failure of the secondary sealing cup.

It is, therefore, an object of this invention to provide an improved master cylinder which is noncup cutting yet overcomes the aforementioned drawbacks of the previous non-cup cutting master cylinder designs.

SUMMARY OF THE INVENTION

The master cylinder of the present invention includes a reservoir and a cavity. A fluid chamber is formed in the cavity and a fluid path extends between the reservoir and the fluid chamber. A first piston is movable in the cavity for increasing the fluid pressure in the fluid chamber. A second piston is movable within the first piston. A sealing member is positioned for movement with the first piston. When the master cylinder is in the fully released position, the second piston is sealingly disengaged from the sealing member to open the fluid path. However, when the first piston is being moved forward in the cavity to increase the fluid pressure in the fluid chamber, the second piston is sealingly engaged with the sealing member to close the fluid path.

The present invention is applicable to both the "single brake system" type of master cylinders and the tandem "dual brake system" type of master cylinders.

DESCRIPTION OF THE DRAWING

The FIGURE is a cross-sectional side elevation view of a master cylinder embodying the present invention.

DESCRIPTION OF THE PREFERRED EMBODIMENT

In the figure, the preferred embodiment of the master cylinder of the present invention is generally designated 10 and includes a housing 12, preferably formed of a suitable metal, having a reservoir 14 and a cavity 16. The cavity 16 has first and second ends 18 and 20, respectively, and a bore 22. A port 24 provides fluid communication between the reservoir 14 and the cavity 16. A plug 26 with an outlet port 28 is threadedly received in the cavity first end 18. A filler cap 30 is disposed in the upper end of the reservoir 14. Gasket seals 29 and 31 are disposed between the housing 12 and the plug 26 and filler cap 30, respectively. A plate 32 having an opening 33 therethrough is disposed in the cavity second end 20 and is retained therein by a retainer ring 34.

A first or main piston 36, preferably formed of a suitable metal, is movably positioned in the cavity bore 22. The main piston 36 includes first and second annular end portions 38 and 40, respectively, of equal diameter and a reduced diameter annular portion 42 therebetween. The main piston 36 also includes a socket 44 in the second end portion 40, a central bore 46, a bore 48 connecting the socket 44 and the central bore 46 thereby forming an annular shoulder 50 in the socket 44 and an annular shoulder 52 in the central bore 46, and ports 54 extending through the reduced portion 42 into the central bore 46. The main piston second end portion 40 carries a seal member 56 in sliding engagement and sealing engagement with the annular wall of the cavity bore 22 to prevent fluid leakage from the cavity second end 20.

A sealing cup 58, preferably formed of resilient material such as a suitable rubber, is movably positioned in the cavity bore 22 adjacent the main piston first end portion 38. The sealing cup 58 has a central opening 60, an annular outer lip 62 in sliding and sealing engagement with the annular wall of the cavity bore 22, and an annular inner lip 64. A protector ring 66, preferably formed of flexible material such as leather, is positioned between the main piston first end portion 38 and the sealing cup 58. A coil spring 68 is disposed in the cavity 16 in a compressive state thereby normally urging the sealing cup 58, the protector ring 66, and the main piston 36 toward the left in the figure so that the main piston second end portion 40 is in engagement with the plate 32. A retainer plate 70 having a central hole 71 therethrough maintains the spring 68 in proper alignment with the sealing cup 58 and is also normally urged leftward by the spring 68.

In the master cylinder art, the sealing cup 58 is usually referred to as the primary sealing cup, and the seal member 56 is usually referred to as the secondary sealing cup.

A second or inner piston 72, preferably formed of a suitable metal, is movably positioned in the main piston central bore 46. The inner piston 72 includes first and second annular end portions 74 and 76, respectively, of equal diameter and a reduced diameter annular portion 78 therebetween. The inner piston 72 also includes a cavity 80 in the first end portion 74, a bore 82 extending transversely through the reduced portion 78, a bore 84 connecting the bore 82 and the cavity 80, and an extension 86 on the second end portion 76 extends through the main piston bore 48. The inner piston second end portion 76 carries an O-ring seal 88 in sliding and sealing engagement with the annular wall of the main piston central bore 46 to prevent the fluid leakage through the bore 48. A check valve member 90 is disposed in the inner piston cavity 80 and is normally urged into sealing engagement with the inner end of the cavity 80 by a coil spring 92 to prevent fluid communication between the bore 84 and the cavity 80. A plate member 94 having passages therethrough is also disposed in the inner piston cavity 80 to hold the spring 92 in a relatively light compressive state.

A push rod 96 operated by a brake pedal (not shown) extends through the opening 33 in the plate 32 for engagement with the inner piston extension 86. The master cylinder 10 is designed such that the diameter of the push rod 96 is greater than the diameter of the inner piston extension 86 but is less than the outside diameter of the socket annular shoulder 50.

In the assembled master cylinder 10, a fluid chamber 100 is formed in the cavity to the right of the main piston 36, a fluid chamber 102 is formed between the cavity bore 22 and the main piston reduced portion 42, and a fluid chamber 104 is formed between the main piston central bore 46 and the inner piston reduced portion 78. There is a fluid path between the reservoir 14 and the fluid chamber 100 via the port 24, the fluid chamber 102, the ports 54, the fluid chamber 104, and the clearance between the annular surfaces of the inner piston first end portion 74 and the main piston central bore 46. When the master cylinder 10 is in the fully released position, as shown in the figure, this fluid path is open and fluid may flow between the fluid chamber 100 and the reservoir 14 via this fluid path to compensate for increases and decreases in the volume of the fluid due to temperature changes and fluid seepage.

OPERATION

When the vehicle operator depresses the brake pedal (not shown), a force is exerted on the push rod 96 and it is initially moved into engagement with the inner piston extension 86. The push rod 96 then moves the inner piston 72 toward the right in the figure while the main piston 36 remains stationary. As the inner piston 72 is moved rightward, the first end portion 74 thereof passes through the center of the protector ring 66 and then through the central opening 60 in the sealing cup 58 into sealing engagement with the sealing cup inner lip 64. This closes the previously described fluid path, thus closing fluid communication between the reservoir 14 and the fluid chamber 100. The inner piston 72 is moved rightward by the push rod 96 while the main piston 36 remains stationary until the end surface of the inner piston extension 86 becomes flush with the surface of the socket annular shoulder 50. The push rod 96 then also engages the socket annular shoulder 50 thereby moving the main piston 36, the inner piston 72, and the sealing cup 58 rightward together against the force of the spring 68 to increase the fluid pressure in the fluid chamber 100 and deliver the fluid through the outlet port 28 to the remaining portions of the brake system (not shown). During this rightward movement, the inner piston first end portion 74 is maintained in sealing engagement with the sealing cup inner lip 64 and the check valve member 90 is maintained in sealing engagement with the inner end of the inner piston cavity 80. As the fluid pressure increases in the fluid chamber 100, the protector ring 66 prevents high pressure extrusion of portions of the sealing cup 58 into the clearance between the annular surfaces of the main piston first end portion 38 and the cavity bore 22 and into the clearance between the annular surfaces of the inner piston first end portion 74 and the main piston central bore 46.

When the brake pedal is released, the push rod 96 is retracted by conventional means (not shown) such as a return spring. The force of the spring 68 and the fluid pressure in the fluid chamber 100 then move the main piston 36, the inner piston 72, and the sealing cup 58 leftward together until the main piston second end portion 40 engages the plate 32. As the main piston 36, the inner piston 72, and the sealing cup 58 are moved leftward together, the inner piston 72 remains stationary in relation to both the main piston 36 and the sealing cup 58 with the first end portion 74 thereof remaining in sealing engagement with the sealing cup inner lip 64. Subsequent to the main piston second end portion 40 engaging the plate 32, the fluid pressure in the fluid chamber 100 moves the inner piston 72 leftward until the second end portion 76 thereof engages the annular shoulder 52 in the main piston central bore 46. During this leftward movement of the inner piston 72, the first end portion 74 thereof moves out of engagement with the sealing cup 58 to re-open the previously described fluid path. The master cylinder 10 is then in the fully released position again as shown in the figure.

As the main piston 36 and the inner piston 72 are moved leftward, the check valve member 90 is moved against the force of the spring 92 out of sealing engagement with the inner end of the inner piston cavity 80. This opens fluid communication between the inner piston bore 84 and cavity 80 thereby allowing fluid to flow from the reservoir 14 through the inner piston 72 to the fluid chamber 100 to relieve the vacuum which forms in the fluid chamber 100 during the leftward movement of the main piston 36 and the inner piston 72. When the master cylinder 10 returns to the fully released position, the check valve member 90 is urged by the spring 92 into re-engagement with the inner end of the inner piston cavity 80 to close fluid communication between the inner piston bore 84 and cavity 80. Any excess fluid in the fluid chamber 100 and in the remaining portions of the brake system then flows back to the reservoir 14 via the previously described fluid path.

It is apparent that in the master cylinder 10 there is no cup cutting associated with the sealing cup 58 since the conventional compensating or by-pass port has been eliminated. It is also apparent that during normal operation of the master cylinder 10 there are no fluid pressure surges in the fluid chamber 102 which could cause failure of the seal member 56.

It will be understood that the claims are intended to cover all modifications and variations of the preferred embodiment of the invention, herein chosen for the purpose of illustration, without departing from the spirit and scope of the invention.

What is claimed is:

1. A master cylinder comprising:
   (a) a housing having an inner wall defining a cavity therein;
   (b) a fluid reservoir;
   (c) a fluid chamber in said cavity;
   (d) a first piston movable in said cavity for increasing the fluid pressure in said fluid chamber, said first piston including a central bore therein and a socket at the rearward end thereof, said central bore and said socket each having an annular shoulder therein;
   (e) a fluid path between said fluid reservoir and said fluid chamber extending through said first piston;
   (f) a sealing member engaging the housing inner wall over positioned adjacent the forward end of said first piston for movement therewith;
   (g) a second piston movable in said central bore in said first piston, said second piston including an extension extending into said first piston socket;
   (h) said second piston being sealingly disengaged from said sealing member to open said fluid path and said second piston being in contact with the annular shoulder in said first piston central bore when said first and second pistons are in their fully released positions;
   (i) said second piston being sealingly engaged with said sealing member to close said fluid path when said first piston is being moved forward in said cavity to increase the fluid pressure in said fluid chamber; and
   (j) a push rod being in contact with said second piston extension and with the annular shoulder in said first piston socket in order to move said first and second pistons forward in said cavity.

2. The master cylinder recited in claim 1, further comprising:
   (a) another fluid path between said fluid reservoir and said fluid chamber extending through said second piston; and
   (b) a check valve member carried by said second piston for normally closing said another fluid path.

3. The master cylinder recited in claim 1 wherein:
   (a) said first piston central bore is of substantially uniform diameter;
   (b) said housing and said first piston have port means for permitting fluid communication between said fluid reservoir and said central bore; and
   (c) said second piston includes forward and rearward annular end portions of substantially equal diameter.

* * * * *